United States Patent [19]
Swart

[11] 3,907,636
[45] Sept. 23, 1975

[54] PIPE PENETRATION STRUCTURE FOR A NUCLEAR REACTOR

[75] Inventor: Walter Swart, Delft, Netherlands

[73] Assignee: De Rotterdamsche Droogdok Maatschappij B.V., Rotterdam, Netherlands

[22] Filed: Nov. 15, 1972

[21] Appl. No.: 306,834

[52] U.S. Cl. .................................. 176/87; 285/158
[51] Int. Cl. ............................................. G21c 13/00
[58] Field of Search ............ 285/115, 149, 398, 31, 285/24, 64, 110, 142, 158, 192, 224, 235, 405, 408; 176/87

[56] References Cited
UNITED STATES PATENTS

| | | | |
|---|---|---|---|
| 3,232,643 | 2/1966 | Mikeska | 285/158 |
| 3,240,514 | 3/1966 | Bell | 285/158 |
| 3,536,584 | 10/1970 | Long et al. | 176/87 |

FOREIGN PATENTS OR APPLICATIONS

| | | | |
|---|---|---|---|
| 6,507,072 | 3/1965 | Netherlands | 176/87 |

*Primary Examiner*—Harvey E. Behrend
*Attorney, Agent, or Firm*—Fleit & Jacobson

[57] ABSTRACT

A pipe penetration structure for the wall of a nuclear reactor vessel, such as the cover thereof, including a hole in the wall, having a stepped part as a transition between a narrower bore and a wider bore and a bushing, extending through the hole, the bushing being connected to the interior of the hole in the narrower bore part of the hole, and being double-walled in the wider bore part of the hole, the two walls of the bushing in the wider part being connected outside the vessel wall by a thin and curved transition wall forming a flexible joint, and the outer wall of the double-walled part of the bushing being welded to the vessel wall.

11 Claims, 1 Drawing Figure

US Patent  Sept. 23,1975  3,907,636
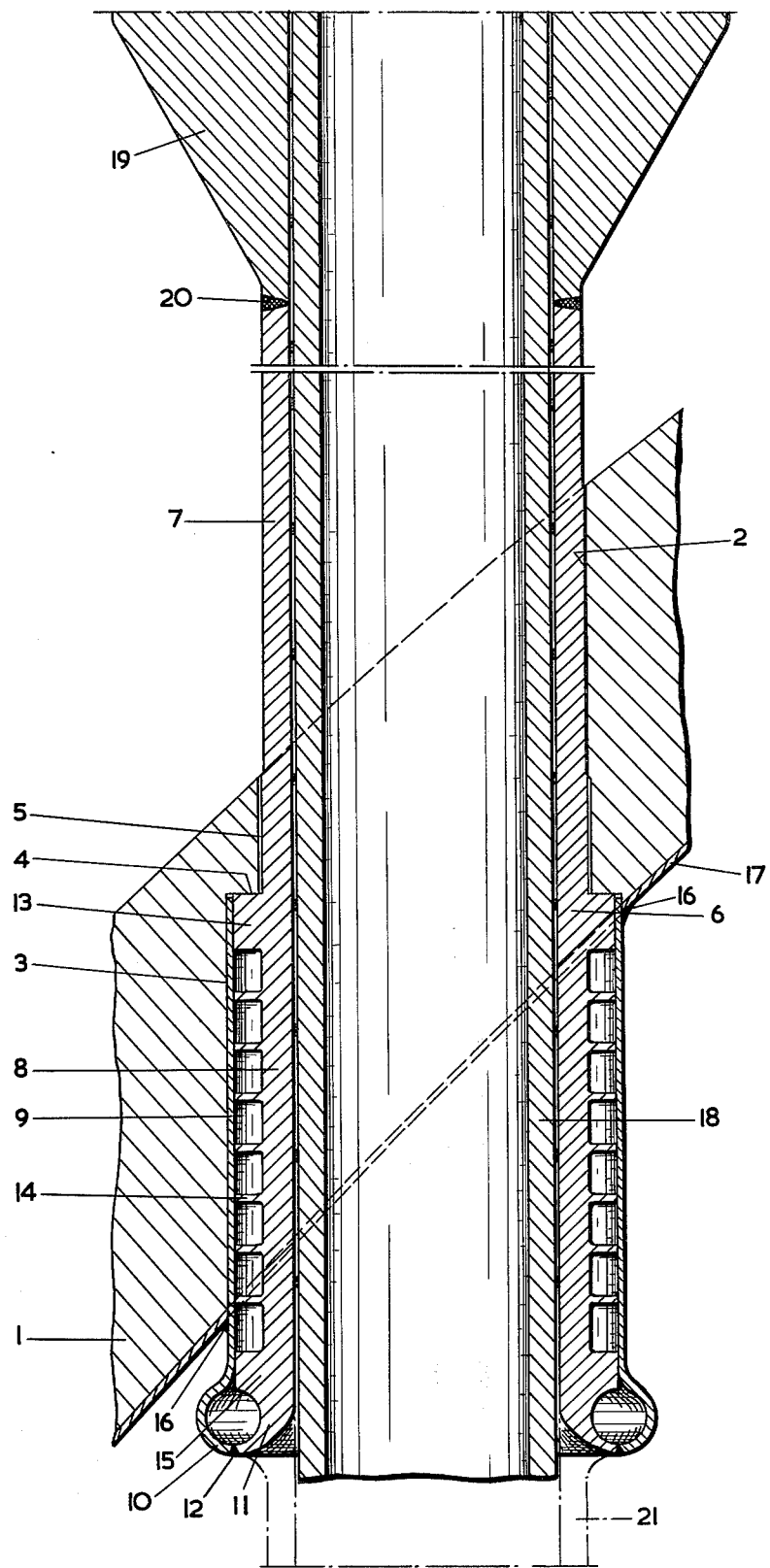

PIPE PENETRATION STRUCTURE FOR A NUCLEAR REACTOR

This invention relates to a pipe penetration structure for a nuclear reactor vessel wall.

At nuclear power stations, which are already in operation, any additional work on the reactor vessel or the reactor vessel cover can not simply be done because of the radioactive radiation and contamination which restricts the available time span for each person working at such components.

In addition welding on low alloy steel components should be avoided as much as possible when preheating of the part to be welded and consequent local stress relieving is required.

On the other hand the need has been felt on several occasions to make pipe penetrations through the wall of the reactor vessel, either through a cover or through other parts of said wall, after the reactor has been in operation and on the site. This is e.g. the case for making inlets for cooling liquid such as water for flooding the reactor core therewith in case of emergency or accident.

When manufacturing the reactor vessel such pipe penetrations can be made rather easily. Sometimes they are made by deposit or overlay welding, i.e. welding thin layers onto the vessel wall to obtain a stub or protruding butt-end on the vessel wall, which may be used to weld a tube thereto after drilling a hole through the wall and the stub. The vessel wall can be inspected carefully e.g. by X-rays after welding, and the vessel can either be annealed entirely after welding (which is easy for separate covers), or annealing of the welding region may take place by having each welding layer when applied anneal the previously welded layer. Each welding layer is in such cases often applied after grinding away part of the thickness of the previous layer. All this is very difficult in reactor vessels which have been placed in the containment building and is even impossible for a reactor vessel that has been put in operation. These vessels give radiation and contamination dangers. For repairs the vessels should be out of service for the shortest possible period.

It has been proposed to make pipe penetration structures by simple holes with internal screw-threaded parts, into which a pipe, bushing or sleeve is threaded, but this is often not allowed in view of the danger of internal crack-building or opening up of cracks in the vessel wall (laminar tearing).

This invention aims at providing a pipe penetration structure, which is quite suitable for applying in existing nuclear reactor vessels after operation thereof and on the site, without danger of deficiencies in the wall of the vessel such as laminar tearing, without the need of long interruptions of the operation and with the least possible danger for personnel making the penetrations on the site.

It will be clear that in this specification and in the claims attached hereto the expression vessel wall is also used for parts of said wall forming separate and detachable parts thereof such as covers for a reactor vessel. When applying the invention to such a cover it may be detached from the remainder of the vessel and supported on suitable blocks on the service floor, where drilling, screw-threading, insertion of the bushing and welding can take place.

In view of the above, a pipe penetration structure for a nuclear reactor according to the invention includes a hole in said vessel wall, having a stepped part as a transition between a narrower bore and a wider bore, and a bushing, extending through said hole, being connected as by a screw-threaded part to the interior of the hole in the narrower bore part of the hole, and being double-walled in the wider bore part of the hole, the two walls of said bushing in said wider part being connected outside the vessel wall by a thin transition wall forming a flexible joint, and the outer wall of the double-walled part of the bushing being welded to the vessel wall.

The invention will now be explained in more detail with reference to the enclosed drawing.

BRIEF DESCRIPTION OF THE DRAWINGS

This drawing shows the preferred embodiment of the invention in axial section through a pipe penetration structure in the cover of a nuclear reactor vessel.

In the drawing part of the reactor vessel cover is shown and is indicated by 1. A hole is drilled therein, having a narrower bore part 2 and a wider bore part 3, with a stepped transition 4 as a shoulder face in a plane perpendicular to the axis of the hole. Part of the narrower bore part 2 is screw-threaded at 5. A bushing 6 fits into this hole, is introduced therein from below as seen in the drawing and is screwed therein with a screw-threaded part at 5. The bushing 6 substantially consists of a narrower, single-walled part at 7 and a wider, double-walled part 8, 9. The inner wall 8 thereof has about the same thickness as single part 7 and the outer wall 9 is much thinner. These walls are united at the lower end of the drawing by a thin curved transition wall 10, 11, forming a flexible joint. Outer wall 9 is manufactured as a separate sleeve, with an outwardly bulged toroidal part 10 united with transition wall part 11 by a welded seam 12. Part 11 gradually decreases in thickness outwardly to merge from the thickness of bushing part 8 to the thickness of outer wall 9 at the weld seam 12. Seam 12 is positioned on an imaginary cylinder with a diameter equal to the internal diameter of wall 9.

Inner wall 8 has a number of protruding collars in planes perpendicular to the bushing axis, one thick collar 13 at the inner end, thinner collars 14 and one thick collar 15 at the outer end near the flexible joint, 10, 11, 12. These collars all have the same outer diameter in contact with the inner surface of outer wall 9 to support this thin wall and to be itself supported by this wall 9 and thus by the vessel cover 1. Collar 13 is in close contact with the stepped transition 4 due to the tight screwing in of the bushing 6 in the vessel wall 1.

Sealing of the bushing 6 in the hole is ensured by a seal weld 16, made by hand or by a welding machine as a fillet weld between the wall 9 and the internal cladding 17 of the reactor vessel cover 1.

For using this bushing 6 to allow a fluid such as cold water to enter the vessel in case of an emergency, the structure is shown as having an inner pipe 18 extending all through the bushing 6 and further into the vessel. This pipe 18 may be connected to the outer (top) end of bushing 6 as by welding or by a screw-threaded connection, and the bushing 6 itself may be provided with a connecting fixture 19 by a weld seam 20 at its outer (top) end, or there may be other types of connecting means known as such to connect bushing 6 and pipe 18 mutually and to connect any of these parts to a further duct for supplying the water or other fluid.

The inner pipe 18 will protect the bushing 6 and the vessel wall or cover 1 from high temperature gradients if cold water is supplied through pipe 18. Thus it serves as a thermal sleeve. However, bushing 6 by its double-walled part 8, 9 and by the flexible joint 10, 11, 12 between these parts is adapted to take up rather high temperature gradients by itself without damage. Thus, in some instances, the inner pipe 18 may be omitted, the bushing 6 itself guiding the fluid such as cooling water. In this case the lower end of inner wall 8 of the bushing may be extended to form a downwardly protruding extension into the vessel, indicated by 21 and dotted lines in the drawing. This may terminate near the reactor core at any suitable point, e.g. giving a good communication with a cooling passage or the like in the reactor core. If inner pipe 18 is used, this will terminate at such a point.

The flexible joint 10, 11, 12 prevents the seal weld 16 from being subjected to a high loading resulting from different axial and radial expansion and permits a rather undisturbed and symmetrical expansion of the bushing 6.

As outer wall 9 is very thin, seal weld 16 may be very thin, which simplifies and accelerates welding.

The execution of mounting such an additional pipe penetration in a reactor vessel cover 1 may be as follows: With the aid of a mobile boring machine which can be mounted on the site on a supporting structure provided with adjustable guide pins the hole is drilled and bored after which screw thread at 5 is tapped. The boring machine and guide pins therefor can be mounted and adjusted on the supporting structure in the absence of the vessel cover 1. After checking the mutual position of boring machine and guide pins and adjusting the boring tools for the correct diameter and depth, the reactor vessel cover 1 will be placed on the structure and the drilling and boring operation can be run by remote control. In case more penetrations have to be made this procedure can be repeated for each hole, or, if preferred, a multiple-spindle machine can be applied.

It is an essential advantage of the invention that personnel has to come close to radio-active parts only during a very short time interval. The pipe penetration can easily be replaced, although it is improbable that this will ever be necessary, also after e.g. unintentional supply of cooling water therethrough.

After a surface check the screw thread at 5 is tapped and a small area of the cladding 17 around the hole is cleaned by grinding or grit-blasting. Then the bushing 6, with outer wall 9 already connected to it, is brought into the hole and screwed up tightly onto the transition 4.

Thereafter the seal weld 16 is laid by manual welding (or with a special welding device) of a fillet weld between the thin outer wall 9 and the cladding 17 of the reactor vessel cover.

The seal welds 12 and 16 need only to be checked by a liquid penetrant test, as these welds are no pressure or strength welds. So, no in-service inspection of these welds is necessary.

Finally the bushing 6 should be locked by simple outside means known as such and not shown to protect the seal weld 16 against torque loading in case the connections of bushing 6 to other parts may introduce reactions and the bushing is not screwed-in sufficiently tightly.

I claim:

1. A pipe penetration structure in the wall of a nuclear reactor vessel to enable flooding a hot core of the reactor in the event of emergency or accident by passing a cooling liquid through the wall, the structure comprising in combination: a nuclear reactor vessel having a wall for receiving said penetrating structure, a stepped bore in said wall, the step of said stepped bore providing a transition between a narrow bore section and a wide bore section, a bushing extending into and through said bore and into the reactor vessel, said bushing comprising a first bushing section connected to said wall in the region defining the narrow section of said bore and a second wider bushing section engaging said wall in the region defining the wide section of said bore, said first and second bushing sections having therebetween a stepped section which abuts the step of said stepped bore, said second section being a double walled section comprising an inner wall continuous with said first bushing section and being of a first thickness, and a thinner outer wall originating within the wide bore section and in contact therewith, means associated with said inner wall for supporting said outer wall along its length and for maintaining said outer wall in continuous contact with said wide bore section, said inner and outer walls projecting into and terminating within the reactor vessel in a thin circular transition joint having a weld seam sealing said inner and outer walls at and around said transition joint, a very thin seal weld joint securing the outer wall of said bushing to the vessel wall on the inside thereof, said thin circular transition joint defining a flexible joint in which the outer thinner wall flexes to tolerate the temperature differential between cooling liquid and the hot interior of the reactor vessel without unduly stressing said thin seal weld joint.

2. A pipe penetration structure according to claim 1, wherein the outer wall of the bushing is of much thinner wall-thickness than the inner wall.

3. A pipe penetration structure according to claim 1, wherein the inner wall of the bushing has a radially protruding collar structure in contact with the inner surface of the outer wall of the bushing along a contact zone in several areas over the entire length of said walls.

4. A pipe penetration structure according to claim 3, wherein the collar structure includes a number of flat radial collars in planes perpendicular to the axis of the bushing.

5. A pipe penetration structure according to claim 1, wherein the weld seam in the transition joint is positioned at the same diameter as the inner surface of the outer wall of the bushing, said outer wall being connected to the seam by a part of said wall bulging outwardly with respect to the part of said outer wall extending into said bore in the wall of said vessel.

6. A pipe penetration structure according to claim 5, wherein the outer wall of the bushing is of much thinner wall thickness than the inner wall and in which the thicker inner wall of the bushing curves gradually outwardly to the weld seam while decreasing gradually in thickness from the said thicker inner wall to substantially the same thickness as the outer wall of the bushing at the weld seam.

7. A pipe penetration structure according to claim 1, wherein the narrow bore section is positioned towards the outside of the vessel wall and the wide bore section is positioned towards the inside of said vessel wall.

8. A pipe penetration structure according to claim 1, wherein a separate pipe extends through the bushing and inside the wall of the vessel said pipe being sealingly connected to the bushing outside the vessel wall at the side closer to the narrow bore section than to the wide bore section.

9. A pipe penetration structure according to claim 1, wherein the inner wall of the bushing extends inside the wall of the vessel, so that the bushing itself forms the duct for guiding a fluid into the reactor.

10. A pipe penetration structure according to claim 1 wherein said flexible joint loads said brushing in said vessel wall and permits symetrical expansion of said bushing.

11. A pipe penetration structure according to claim 1 wherein said vessel wall narrow bore section is formed with screw threads and said bushing first section is formed with screw threads.

* * * * *